United States Patent
Liu et al.

(10) Patent No.: US 12,173,096 B2
(45) Date of Patent: Dec. 24, 2024

(54) UNIMODAL POLYETHYLENE COPOLYMER AND FILM THEREOF

(71) Applicant: Univation Technologies, LLC, Houston, TX (US)

(72) Inventors: Bo Liu, Lake Jackson, TX (US); Yi Zhang, Hopkinton, MA (US); Ayush A. Bafna, Manvel, TX (US); François Alexandre, Saint-Leonard (CA); Kevin R. Gross, Port Lavaca, TX (US)

(73) Assignee: UNIVATION TECHNOLOGIES, LLC, Houston, TX (US)

(*) Notice: Subject to any disclaimer, the term of this patent is extended or adjusted under 35 U.S.C. 154(b) by 952 days.

(21) Appl. No.: 17/047,742

(22) PCT Filed: May 8, 2019

(86) PCT No.: PCT/US2019/031233
§ 371 (c)(1),
(2) Date: Oct. 15, 2020

(87) PCT Pub. No.: WO2019/226344
PCT Pub. Date: Nov. 28, 2019

(65) Prior Publication Data
US 2021/0070902 A1   Mar. 11, 2021

Related U.S. Application Data
(60) Provisional application No. 62/675,907, filed on May 24, 2018.

(51) Int. Cl.
| | | |
|---|---|---|
| C08F 210/16 | (2006.01) | |
| B29C 48/00 | (2019.01) | |
| B29C 48/10 | (2019.01) | |
| C08J 5/18 | (2006.01) | |
| B29K 23/00 | (2006.01) | |
| B29K 105/00 | (2006.01) | |
| C08F 210/08 | (2006.01) | |

(52) U.S. Cl.
CPC ........ *C08F 210/16* (2013.01); *B29C 48/0018* (2019.02); *B29C 48/10* (2019.02); *C08J 5/18* (2013.01); *B29K 2023/08* (2013.01); *B29K 2105/0085* (2013.01); *C08F 210/08* (2013.01); *C08J 2323/08* (2013.01); *C08J 2323/18* (2013.01)

(58) Field of Classification Search
CPC ...... C08F 210/16; C08F 210/08; B29C 48/10; B29C 48/0018; B29K 2023/08; B29K 2023/18; C09J 2323/08
See application file for complete search history.

(56) References Cited

U.S. PATENT DOCUMENTS

| | | |
|---|---|---|
| 2,825,721 A | 3/1958 | Paul et al. |
| 3,023,203 A | 2/1962 | Dye |
| 3,324,101 A | 6/1967 | Baker et al. |
| 3,622,251 A | 11/1971 | Allen |
| 3,704,287 A | 11/1972 | Johnson |
| 3,709,853 A | 1/1973 | Karapinka |
| 4,003,712 A | 1/1977 | Miller |
| 4,011,382 A | 3/1977 | Levine et al. |
| 4,100,105 A | 7/1978 | Levine et al. |
| 4,302,566 A | 11/1981 | Karol et al. |
| 4,447,387 A * | 5/1984 | Blakeslee, III ....... B29C 48/913 425/72.1 |
| 4,453,399 A | 6/1984 | Thompson |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,489,408 B2 | 12/2002 | Mawson et al. |
| 6,815,925 B2 | 11/2004 | Chen et al. |
| 6,989,344 B2 | 1/2006 | Cann et al. |
| 7,078,467 B1 | 7/2006 | Kolb et al. |

(Continued)

FOREIGN PATENT DOCUMENTS

| | | |
|---|---|---|
| EP | 0634421 | 1/1995 |
| EP | 0794200 | 9/1997 |

(Continued)

OTHER PUBLICATIONS

Starck, P et al. "Thermal and Rheological Studies on the Molecular Composition and Structure of Metallocene and Ziegler-Natta-Catalyzed Ethylene-α-Olefin Copolymer" Journal of Applied Polymer Science, 2002, vol. 83, 1140-1156 (Year: 2002).*

(Continued)

*Primary Examiner* — Ling Siu Choi
*Assistant Examiner* — David L Miller

(57) ABSTRACT

A unimodal ethylene-co-1-butene copolymer that, when in melted form at 190 degrees Celsius, is characterized by a unique melt property space defined by combination of shear thinning and melt elasticity properties. A blown film consisting essentially of the unimodal ethylene-co-1-butene copolymer. A method of synthesizing the unimodal ethylene-co-1-butene copolymer. A method of making the blown film. A manufactured article comprising the unimodal ethylene-co-1-butene copolymer.

6 Claims, No Drawings

(56) References Cited

U.S. PATENT DOCUMENTS

| | | |
|---|---|---|
| 7,157,531 B2 | 1/2007 | Szul et al. |
| 7,223,825 B2 | 5/2007 | Kolb et al. |
| 7,300,988 B2 | 11/2007 | Kolb et al. |
| 7,504,467 B2 | 3/2009 | Ochs |
| 8,227,552 B2 | 7/2012 | Kolb et al. |
| 8,497,329 B2 | 7/2013 | Kolb et al. |
| 9,303,103 B2 | 4/2016 | Moorhouse et al. |
| 9,815,925 B2 | 11/2017 | Lam et al. |
| 9,815,926 B2 | 11/2017 | Kolb et al. |
| 11,161,924 B2 | 11/2021 | Liu et al. |
| 2002/0150648 A1 | 10/2002 | Cree |
| 2005/0033000 A1 | 2/2005 | Ohta et al. |
| 2006/0173123 A1 | 8/2006 | Yang et al. |
| 2011/0010938 A1 | 1/2011 | Moorhouse et al. |
| 2016/0068623 A1 | 3/2016 | Kapur et al. |
| 2016/0297907 A1 | 10/2016 | Goode et al. |
| 2017/0274356 A1 | 9/2017 | Cann et al. |
| 2018/0022844 A1 | 1/2018 | Lam et al. |

FOREIGN PATENT DOCUMENTS

| | | |
|---|---|---|
| EP | 0802202 | 10/1997 |
| WO | 2017/132092 | 8/2017 |
| WO | 2019/083716 | 5/2019 |

OTHER PUBLICATIONS

PCT/US2019/031233, International Search Report and Written Opinion with a mailing date of Aug. 12, 2019.
Report Letter from corresponding Indian Application No. 202017052189 dated Oct. 6, 2023.

\* cited by examiner

UNIMODAL POLYETHYLENE COPOLYMER AND FILM THEREOF

FIELD

Polyethylene copolymers, films, manufactured articles, and related methods.

INTRODUCTION

Patent application publications in or about the field include US 2016/0068623 A1; US 2016/0297907 A1; and WO 2017/132092 A1. Patents in or about the field include U.S. Pat. Nos. 6,989,344 B2; 7,078,467 B1; 7,157,531 B2; 7,223,825 B2; 7,300,988 B2; 8,227,552 B2 and 8,497,329 B2.

SUMMARY

A unimodal ethylene-co-1-butene copolymer that, when in melted form at 190 degrees Celsius (° C.), is characterized by a unique melt property space defined by a combination of shear thinning and melt elasticity properties ("the unimodal ethylene-co-1-butene copolymer").

A method of synthesizing the unimodal ethylene-co-1-butene copolymer, the method consisting essentially of polymerizing ethylene (monomer) and 1-butene (comonomer) with a single unimodal catalyst system in a single fluidized-bed, gas phase polymerization (FB-GPP) reactor under effective operating conditions, thereby making the unimodal ethylene-co-1-butene copolymer. The "consisting essentially of" transitional phrase means the method is free of other catalysts (i.e., is free of a multimodal or bimodal catalyst system or two or more separate catalysts), the polymerizing is carried out in a single reactor (i.e., in the FB-GPP reactor), and the operating conditions are effective for imparting the unique combination of shear thinning and melt elasticity properties to the unimodal ethylene-co-1-butene copolymer. Other than that, the method's constituents and operating conditions are not particularly limited.

A film consisting essentially of the unimodal ethylene-co-1-butene copolymer ("the film"). The film is characterized by enhanced (increased) toughness and/or enhanced bubble stability (decreased bubble instability). The "consisting essentially of" transitional phrase means the film is free of other polyolefin polymers, but otherwise its constituents are not particularly limited.

A method of making a blown film, the method comprising melting the unimodal ethylene-co-1-butene copolymer to give a melt thereof, extruding the melt through a die configured for forming a bubble so as to make a bubble of the unimodal ethylene-co-1-butene copolymer, and blowing (inflating) the bubble with a film-blowing machine, thereby making the blown film.

A manufactured article comprising the unimodal ethylene-co-1-butene copolymer.

DETAILED DESCRIPTION

The Summary and Abstract are incorporated here by reference. Certain embodiments are described below as numbered aspects for easy cross-referencing.

Aspect 1. A unimodal ethylene-co-1-butene copolymer that, when in melted form at 190° C., is characterized by a melt property space defined by a combination of shear thinning and melt elasticity properties, wherein the shear thinning property is defined according to equation 1 (Eq. 1): G' (G"=3,000 Pa)<66.6*MFR5+630 (Eq. 1); and the melt elasticity property is defined according to equation 2 (Eq. 2): G' (G"=3,000 Pa)<23.5*SH1000+1182 (Eq. 2); wherein < is less than; * is multiplication; / is division; = is equals; G' (G"=3,000 Pa) is melt elasticity in Pascals (Pa) measured according to Melt Storage Modulus Test Method (described herein) at loss modulus G"=3000 pascals; MFR5 is melt flow ratio $I_{21}/I_5$; $I_{21}$ is high-load melt index (HLMI) in grams per 10 minutes (g/10 min.) measured according to ASTM D1238-13 (190° C., 21.6 kg); $I_5$ is melt index in g/10 min. measured according to ASTM D1238-13 (190° C., 5.0 kg); SH1000=Eta0.126/Eta126; Eta0.126 is complex viscosity in pascal-seconds (Pa-s) measured at 0.126 radian per second (rad/s) by Dynamic Mechanical Analysis Test Method (described herein); and Eta126 is complex viscosity Pa-s measured at 126 rad/s by the Dynamic Mechanical Analysis Test Method. Eta0.126 may also be designated as $(\eta^*)0.126$ and Eta126 may also be designated as $(\eta^*)126$. Dynamic mechanical analysis (DMA) is also known as dynamic mechanical spectroscopy (DMS).

Aspect 2. The unimodal ethylene-co-1-butene copolymer of aspect 1 wherein the melt property space is further defined by any one of limitations (i) to (xii): (i) an $I_{21}$ from 13.0 to 25.0 g/10 min., alternatively from 11.0 to 20.0 g/10 min., alternatively from 14.0 to 20.0 g/10 min., measured according to ASTM D1238-13 (190° C., 21.6 kg); (ii) a MFR5 ("$I_{21}/I_5$") from 20.0 to 27.0, alternatively from 20.5 to 26.4, alternatively from 20.7 to 26.0, measured according to ASTM D1238-13 (190° C., 21.6 kg, "$I_{21}$"; and 190° C., 5.0 kg, "$I_5$"); (iii) an SH1000 from 35.0 to 49.0, alternatively from 35.5 to 48.0, alternatively from 35.9 to 47.5, measured by the Dynamic Mechanical Analysis Test Method; (iv) a melt storage modulus G' (G"=3,000 Pa) value from 1900 to 2300 Pa, alternatively 1950 to 2250, alternatively 1990 to 2236, measured according to the Melt Storage Modulus Test Method; (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 3. The unimodal ethylene-co-1-butene copolymer of aspect 1 or 2 characterized by any one of limitations (i) to (xvii): (i) a density from 0.9410 to 0.9550 gram per cubic centimeter (g/cm³), alternatively 0.9450 to 0.9530 g/cm³, alternatively 0.9480 to 0.9500 g/cm³, measured according to ASTM D792-13, Method B; (ii) a weight-average molecular weight ($M_w$) from 200,000.0 to 400,000.0 grams per mole (g/mol), alternatively 250,000.0 to 350,000.0 g/mol, alternatively 260,000.0 to 310,000.0 g/mol, measured according to the Gel Permeation Chromatography (GPC) Test Method; (iii) a number-average molecular weight ($M_n$) from 11,000.0 to 14,000.0 g/mol, alternatively 11,800.0 to 13,200.0 g/mol, alternatively 11,950 to 12,890 g/mol, measured according to the GPC Test Method; (iv) a z-average molecular weight ($M_z$) from 2,400,000 to 3,600,000 g/mol, measured according to the GPC Test Method; (v) a molecular mass dispersity ($M_w/M_n$), $Đ_M$ from 20.0 to 26.0, alternatively from 20.45 to 25.94, alternatively from 20.50 to 25.90, wherein $M_w$ and $M_n$ are measured according to the GPC Test Method; (vi) both (i) and (ii); (vii) both (i) and (iii); (viii) both (i) and (iv); (ix) both (i) and (v); (x) both (ii) and (iii); (xi) both (ii) and (iv); (xii) both (ii) and (v); (xiii) both (iii) and (iv); (xiv) both (iii) and (v); (xv) both (iv) and (v); (xvi) any four of (i) to (v); and (xvii) each of (i) to (v).

Aspect 4. The unimodal ethylene-co-1-butene copolymer of any one of aspects 1 to 3 that, when in the form of a blown film and having a thickness of 0.0127 millimeter (mm, 0.500 mil), is characterized by any one of limitations (i) to (xii): (i)

a dart impact from 115 to 139 grams (g), alternatively 118 to 136 g, alternatively 119 to 135 g, measured according to the Dart Impact Test Method; (ii) an Elmendorf tear in cross direction (CD) from 40.0 to 160.0 gram-force (gf), alternatively 45 to 159 gf, alternatively 46 to 155 gf, measured according to the Elmendorf Tear Test Method; (iii) an Elmendorf tear in machine direction (MD) from 10.0 to 250.0 gf, alternatively 12 to 23 gf, alternatively 13 to 22 gf, measured according to the Elmendorf Tear Test Method; (iv) a bubble stability rating of Good, measured according to the Bubble Stability Test Method; (v) both (i) and (ii); (vi) both (i) and (iii); (vii) both (i) and (iv); (viii) both (ii) and (iii); (ix) both (ii) and (iv); (x) both (iii) and (iv); (xi) any two of (i) to (iii); and (xii) each of (i) to (iii).

Aspect 5. A method of synthesizing the unimodal ethylene-co-1-butene copolymer of any one of aspects 1 to 4, the method consisting essentially of contacting ethylene and 1-butene with a single catalyst system consisting of a unimodal chromium catalyst system in a single fluidized bed, gas-phase polymerization (FB-GPP) reactor under effective operating conditions comprising a reactor bed temperature (RBT), an average polymer residence time (avgPRT), and an ethylene partial pressure (C2P) and receiving an ethylene ($C_2$) feed, a comonomer ($C_4$) feed, a hydrogen ($H_2$) feed, and, optionally, an oxygen ($O_2$) feed wherein the feeds are characterized by a $H_2/C_2$ gas molar ratio ($H_2/C_2$), a comonomer/ethylene gas molar ratio ("$C_4/C_2$"), and a $O_2/C_2$ gas volume ratio ("$[O_2/C_2]$", vol/vol in ppmv); wherein RBT is from 101° to 111° C.; avgPRT is from 1.70 to 3.10 hours, C2P is from 1,100 to 1,900 kilopascals (kPa); $H_2/C_2$ gas molar ratio is from 0.01 to 0.110; $C_4/C_2$ gas molar ratio is from 0.010 to 0.021, alternatively from 0.011 to 0.0205, alternatively from 0.0150 to 0.0202; and $O_2/C_2$ gas volume ratio is from >0 to 90 parts per billion volume/volume (ppbv), alternatively from 30 to 80 ppbv, alternatively from 31 to 79 ppbv; thereby synthesizing the unimodal ethylene-co-1-butene copolymer in the FB-GPP reactor. The $H_2/O_2$ gas molar ratio, $C_4/O_2$ gas molar ratio, and $O_2/C_2$ gas volume ratio are determined by measuring (e.g., metering) the amounts of $H_2$, $O_2$, $O_4$ and $O_2$ gases being fed into the FB-GPP reactor. The reactor bed temperature RBT and the $H_2/O_2$ gas molar ratio are useful in the method of synthesizing the unimodal ethylene-co-1-butene copolymer that, when in melt form at 190° C., satisfies Eq. 1 and Eq. 2 described earlier. The "consisting essentially of" transitional phrase means the method is free of other catalysts (i.e., is free of a multimodal or bimodal catalyst system or two or more separate catalysts), the polymerizing is carried out in a single reactor (i.e., in the FB-GPP reactor), and the operating conditions are effective for imparting the unique combination of shear thinning and melt elasticity properties to the unimodal ethylene-co-1-butene copolymer. Other than that, the method's constituents and operating conditions are not particularly limited. The unimodal chromium catalyst system and its preparation are described herein. The unimodal chromium catalyst system may be a reduced chromium oxide catalyst system, which along with its preparation are described herein. The reduced chromium oxide catalyst system may be ACCLAIM™ K-100 advanced chrome catalyst (described herein), available from Univation Technologies LLC, Houston, Texas, USA.

Aspect 6. The method of aspect 5 further comprising removing the unimodal ethylene-co-1-butene copolymer from the FB-GPP reactor to give a removed unimodal ethylene-co-1-butene copolymer. In some aspects the removed unimodal ethylene-co-1-butene copolymer may be purged with an inert gas (e.g., $N_2$) to remove entrained hydrocarbons therefrom and/or treated with a stream of humidified nitrogen ($N_2$) gas to deactivate in situ any residual amount of the reduced chromium oxide catalyst system therein. In some aspects the removed unimodal ethylene-co-1-butene copolymer is pelletized to give pellets of the removed unimodal ethylene-co-1-butene copolymer. In some aspects the removed unimodal ethylene-co-1-butene copolymer may be combined with one or more film additives useful in polyethylene films. The combining may comprising melt mixing the one or more film additives into a melt of the removed unimodal ethylene-co-1-butene copolymer. Alternatively the combining may comprise soaking or injecting the one or more film additives into the pellets of the removed unimodal ethylene-co-1-butene copolymer.

Aspect 7. A manufactured article comprising the unimodal ethylene-co-1-butene copolymer of any one of aspects 1 to 4.

Aspect 8. A film consisting essentially of the unimodal ethylene-co-1-butene copolymer of any one of aspects 1 to 4 ("the film"). The "consisting essentially of" transitional phrase means the film is free of other polyolefin polymers, but otherwise its constituents are not particularly limited. The film may be used in packaging applications to protect a substance in need of covering, wherein the film is disposed to at least partially cover the substance. Examples of substances in need of covering are paper, paperboard (e.g., cardboard), food, pharmaceutical compounds, and a stack of paperboard boxes (e.g., wherein the film is a shrink wrap used for wrapping a pallet stacked with paperboard boxes). In some aspects the film is a blown film made as described below.

Aspect 9. A method of making a blown film, the method comprising melting the unimodal ethylene-co-1-butene copolymer of any one of aspects 1 to 4 so as to give a melt thereof, extruding the melt through a die configured for forming a bubble so as to make a bubble of the unimodal ethylene-co-1-butene copolymer, and blowing (inflating) the bubble with a film-blowing machine, thereby making the blown film, which is restricted in one dimension. The bubble is restricted in one dimension. The blown film may be made or fabricated without internal bubble cooling (IBC) by any suitable method, including high stalk film blowing without IBC, such as by using a high stalk film blowing manufacturing line without (active) IBC equipment. The blown film consists essentially of the unimodal ethylene-co-1-butene copolymer of any one of aspects 1 to 4 ("the blown film"). The "consisting essentially of" transitional phrase means the blown film is free of other polyolefin polymers, but otherwise its constituents are not particularly limited.

Embodiments of the blown film may optionally contain zero, one or more film additives. The "film additive" is a compound or material other than a polyolefin polymer that imparts one or more properties to, and/or enhances one or more properties of, the blown film. Examples of film additives are antimicrobial agents, antioxidants, catalyst neutralizers (of chromium-based catalysts), colorants, and light stabilizers. The film additive(s), when present, may be pre-mixed with the unimodal ethylene-co-1-butene copolymer prior to the melting step in the method of making the blown film. Alternatively, film additive(s), when present, may be added to the melt of the unimodal ethylene-co-1-butene copolymer during or after the melting step and prior to the extruding step in the method of making the blown film. When two or more film additives are used, one or more film additives may be pre-mixed with the unimodal ethylene-co-1-butene copolymer prior to the melting step in the method of making the blown film and a one or more film additives may be added to the melt of the unimodal ethylene-co-1-butene copolymer during or after the melting step and prior to the extruding step in the method of making the blown film. In some aspects the blown film consists essentially of the unimodal ethylene-co-1-butene copolymer, at least one antioxidant, and at least one catalyst neutralizer (of chromium-based catalysts). Examples of the at least one antioxidant and at least one catalyst neutralizer are described herein.

Aspect 10. A blown film made by the method of aspect 9 and consisting essentially of the unimodal ethylene-co-1-butene copolymer of any one of aspects 1 to 4 ("the blown film"). The "consisting essentially of" transitional phrase means the blown film is free of other polyolefin polymers, but otherwise its constituents are not particularly limited. The blown film is characterized by enhanced (increased) bubble stability, i.e., decreased bubble instability. The blown film optionally may contain zero, one or more of the film additives. The blown film may be characterized by enhanced (increased) toughness and/or enhanced bubble stability (decreased bubble instability). The blown film may be used in the packaging applications.

The unimodal ethylene-co-1-butene copolymer may be generally described as a medium molecular weight high density polyethylene (MMW HDPE).

The unimodal ethylene-co-1-butene copolymer, films, and method of making the unimodal ethylene-co-1-butene copolymer are free of Ziegler-Natta catalysts, metallocene catalysts, and post-metallocene catalysts. E.g., free of Ti, Hf, Zr metals.

Definitions

As used herein, bubble stability is measured according to the methods described herein.

Catalyst. A material that enhances rate of a reaction (e.g., the polymerization of ethylene and 1-butene) and is not completely consumed thereby.

Catalyst system. A combination of a catalyst per se and a companion material such as a modifier compound for attenuating reactivity of the catalyst, a support material on which the catalyst is disposed, a carrier material in which the catalyst is disposed, or a combination of any two or more thereof, or a reaction product of a reaction of the catalyst per se and the companion material.

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: an article restricted in one dimension. The restricted dimension may be called a thickness of the film, and the thickness is substantially uniform therein. Claimed film properties are measured on 13 (12.7) micrometers thick monolayer films.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Internal bubble cooling or IBC is an aspect of film blowing performed by actively using ancillary, special purpose IBC equipment such as that of US 2002/0150648 A1 to R. E. Cree.

Metallocene catalysts. Substantially single site or dual site catalytic molecules based on metal-cyclopentadienyl ligand complexes.

Post-metallocene catalysts. Substantially single site or dual site catalytic molecules based on metal-ligand complexes wherein the ligand is a substituted cyclopentadienyl or multidentate molecular anion.

Unimodal. When referring to a polymer: having a single peak (no shoulder) in a plot of dW/d Log(MW) on the y-axis versus Log(MW) on the x-axis to give a Gel Permeation Chromatograph (GPC) chromatogram, wherein Log(MW) and dW/d Log(MW) are as defined herein and are measured by Gel Permeation Chromatograph (GPC) Test Method described herein. When referring to a catalyst or catalyst system: producing a unimodal polymer.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator.

Melt elasticity of a thermoplastic polymer can be thought of as the behavior of a melt of the polymer during a shaping process such as extrusion or film formation. It is one of the determinants of viscoelastic melt behavior, wherein viscosity decreases with increasing shear rate. Unsatisfactory melt elasticity may undesirably cause die swell during extrusion or problems with bubble stability during film blowing. A measure of, or proxy for, melt elasticity used herein is a melt storage modulus (G') value that is measured using DMA (Dynamic Mechanical Analysis) on polymer melts at 190° C. by performing small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G' (G"=3,000 Pa) value in pascals of melt storage modulus (G') at a dynamic frequency where loss modulus (G") is equal to 3,000 Pascals.

Polymerization Method

In an illustrative pilot plant process for making the unimodal ethylene-co-1-butene copolymer, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of the unimodal ethylene-co-1-butene copolymer. Configure the FB-GPP reactor with a recycle gas line for flowing a recycle gas stream. Fit the FB-GPP reactor with gas feed inlets and polymer product outlet. Introduce gaseous feed streams of ethylene and hydrogen together with comonomer (e.g., 1-butene) below the FB-GPP reactor bed into the recycle gas line. Control individual flow rates of ethylene ("$C_2$"), hydrogen ("$H_2$") and 1-butene or "$C_4$") to maintain a fixed comonomer to ethylene monomer gas molar ratio ($C_x/C_2$, e.g., $C_4/C_2$) equal to a described value (e.g., 0.0050), a constant hydrogen to ethylene gas molar ratio ("H2/C2") equal to a described value (e.g., 0.0020), and a constant ethylene ("$C_2$") partial pressure equal to a described value (e.g., 1,000 kPa). Measure concentrations of all gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT (e.g., 105° C.). Maintain the fluidized bed at a constant height by withdrawing a portion of the bed at a rate equal to the rate of production of particulate form of the unimodal ethylene-co-1-butene copolymer, which production rate may be from 10 to 20 kilograms per hour (kg/hr), alternatively 13 to 18 kg/hr. Remove the product unimodal ethylene-co-1-butene copolymer semi-continuously via a series of valves into a fixed volume chamber, wherein this removed unimodal ethylene-co-1-butene copolymer is purged to remove entrained hydrocarbons and treated with a stream of humidified nitrogen ($N_2$) gas to deactivate any trace quantities of residual catalyst. See polymerization method described herein.

Polymerization or operating conditions are any variable or combination of variables that may affect a polymerization reaction in the GPP reactor or a composition or property of an unimodal ethylene-co-1-butene copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

Comonomer/ethylene gas molar ratio $C_x/C_2$ of comonomer (1-butene, $O_4$) and ethylene being fed into the gas-phase polymerization (GPP) reactor may be from 0.0001 to 0.1, alternatively from 0.0002 to 0.05, alternatively from 0.0004 to 0.02.

Gas molar ratio of comonomer to ethylene ("$C_x/C_2$ gas molar ratio") is the quantity of all alpha-olefin comonomer(s) ("$C_x$"), in moles, being fed in a gaseous or vaporous state into the GPP reactor divided by the quantity of ethylene monomer ($O_2$), in moles, being fed in a gaseous state into the GPP reactor. The moles of comonomer and moles of ethylene used to calculate the $C_x/C_2$ gas molar ratio values are measured by gas flow meters or other suitable means.

Ethylene partial pressure (e.g., C2P) in the GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene ($H_2/O_2$) gas molar ratio in the GPP reactor is from 0.010 to 0.100, alternatively from 0.011 to 0.094.

Induced condensing agent (ICA). An inert liquid useful for cooling materials in the polymerization reactor(s) (e.g., a fluidized bed reactor). In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an induced condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %.

Oxygen ($O_2$) concentration relative to ethylene ("[$O_2/C_2$]", volume parts $O_2$ per million volume parts ethylene (ppmv)) in the GPP reactor. In some embodiments the [$O_2/C_2$] is from 0.0000 to 0.20 ppmv, alternatively from 0.0001 to 0.200 ppmv, alternatively from 0.0000 to 0.183 ppmv, alternatively from 0.0000 to 0.163 ppmv.

The polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the unimodal ethylene-co-1-butene copolymer. Such reactors and methods are generally well-known in the art. For example, the GPP reactor/method may employ the induced condensing agent and be conducted in condensing mode polymerization such as described in U.S. Pat. Nos. 4,453,399; 4,588,790; 4,994,534; 5,352,749; 5,462,999; and 6,489,408. The GPP reactor/method may be a fluidized-bed gas-phase polymerization reactor (FB-GPP reactor)/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent, a promoter, or a scavenging agent. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or previously made batch of the unimodal ethylene-co-1-butene copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the chromium-based catalyst system (e.g., ACCLAIM™ K-100 advanced chrome catalyst).

In an embodiment the method uses a pilot scale fluidized bed gas phase polymerization reactor (Pilot Reactor) that comprises a reactor vessel containing a fluidized bed of a powder of the unimodal ethylene-co-1-butene copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The chromium-based catalyst system (e.g., ACCLAIM™ K-100 advanced chrome catalyst) may be fed as a slurry or dry powder into the Pilot Reactor from high pressure devices, wherein the slurry is fed via a syringe pump and the dry powder is fed via a metered disk. The chromium-based catalyst system typically enters the fluidized bed in the lower ⅓ of its bed height. The Pilot Reactor further comprises a way of weighing the fluidized bed and isolation ports (Product Discharge System) for discharging the powder of unimodal ethylene-co-1-butene copolymer from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Michigan, USA.

Chromium-Based Catalyst System

The chromium-based catalyst system (e.g., ACCLAIM™ K-100 advanced chrome catalyst) is unimodal and comprises a reduced chromium oxide catalyst compound and, optionally, one or more of a modifying agent, a reducing agent, an activator, and a support material. The reduced chromium oxide catalyst compound may comprise or be a reaction product be prepared from an activated chromium oxide catalyst compound and a reducing agent, optionally modified by a silyl chromate catalyst compound. The chromium-based catalyst system may be unsupported, that is free of a support material. The support material differs from the activator and the chromium-based catalyst compound in at least one of function (e.g., reactivity), composition (e.g., metal content), and property such as porosity. Alternatively, the chromium-based catalyst system may further comprise a support material for hosting the chromium-based catalyst compound and/or an activator. The chromium-based catalyst compound of the chromium-based catalyst system may be activated by any suitable method, which may or may not employ an activator, and under any suitable activating conditions, as described herein.

The chromium oxide catalyst compound comprises $CrO_3$ or any chromium compound convertible to $CrO_3$ under catalyst activating conditions. Compounds convertible to $CrO_3$ are disclosed in, for example, U.S. Pat. Nos. 2,825,721; 3,023,203; 3,622,251; and 4,011,382. Examples are chromic acetyl acetonate, chromic halide, chromic nitrate, chromic acetate, chromic sulfate, ammonium chromate, ammonium dichromate, and other soluble, chromium containing salts. Chromium oxide catalyst compounds include Philips-type catalyst compounds, commonly referred to as "inorganic oxide-supported $Cr^{+6}$" catalysts. A Philips-type catalyst compound may be formed by a process that includes impregnating a $Cr^{+3}$ compound into a silica support, followed by calcining the impregnated silica support under oxidizing conditions at 300° to 900° C., alternatively, 400° to 860° C. to give the Philips-type catalyst compound. Under these conditions, at least some of the $Cr^{+3}$ are converted to $Cr^{+6}$.

The silyl chromate catalyst compound may be a bis(trihydrocarbylsilyl) chromate or a poly(diorganosilyl) chromate. The bis(trihydrocarbylsilyl) chromate may be bis(triethylsilyl) chromate, bis(tributylsilyl) chromate, bis(triisopentylsilyl) chromate, bis(tri-2-ethylhexylsilyl) chromate, bis(tridecylsilyl) chromate, bis(tri(tetradecyl)silyl) chromate, bis(tribenzylsilyl) chromate, bis(triphenylethylsilyl) chromate, bis(triphenylsilyl) chromate, bis(tritolylsilyl) chromate, bis(trixylylsilyl) chromate, bis(trinaphthylsilyl) chromate, bis(triethylphenylsilyl) chromate, or bis(trimethylnaphthylsilyl) chromate. The poly(diorganosilyl) chromate may be polydiphenylsilyl chromate or polydiethylsilyl chromate. In some embodiments, the silyl chromate compound is bis(triphenylsilyl) chromate, bis(tritolylsilyl) chromate, bis(trixylylsilyl) chromate, or bis(trinaphthylsilyl) chromate; alternatively bis(triphenylsilyl) chromate. See U.S. Pat. Nos. 3,324,101; 3,704,287; and 4,100,105.

Supported catalyst compounds. The chromium-based catalyst compound, such as the chromium oxide catalyst compound, the silyl chromate catalyst compound, and/or the reduced chromium oxide catalyst compound, independently may be unsupported, i.e., free of a support material. Alternatively, the chromium-based catalyst compound, such as the chromium oxide catalyst compound, the silyl chromate catalyst compound, or the reduced chromium oxide catalyst compound, may be disposed on a support material. That is, the chromium-based catalyst system may comprise the chromium-based catalyst compound and support material. Typically, the supported reduced chromium oxide catalyst compound is made in situ by contacting a pre-activated and supported chromium oxide catalyst compound, optionally modified with a silyl chromate catalyst compound, with a reducing agent to give an activated and supported reduced chromium oxide catalyst compound.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from a number of sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, all of these silicas are not calcined (i.e., not dehydrated). Silica that is calcined prior to purchase may also be used as the support material.

Supported chromium compounds, such as, for example, supported chromium acetate, are commercially available and may be used as an embodiment of the chromium-based catalyst system. Commercial examples include Davison 957, Davison 957HS, and Davison 957BG products from Davison Chemical Division, and ES370 product from PQ Corp. The supported chromium compound may in the form of spherical particles, which are obtained by a spray-drying process. Alternatively, C35100MS and C35300MS products from PQ Corporation are not spray-dried. As procured, all of these silicas are not activated. Supported chromium compounds that are activated prior to purchase may be used as the supported chromium compound.

Prior to being contacted with a chromium oxide catalyst compound, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. In some aspects the support material is a calcined support material.

In some embodiments the supported chromium oxide catalyst system further comprises a silyl chromate compound as a modifying agent. As such, the silyl chromate compound may be added to a slurry of the activated (unsupported or supported) chromium oxide catalyst system in a non-polar aprotic solvent to give a slurry of a modified activated supported chromium oxide catalyst system. The solvent may be removed by heating, optionally under reduced pressure, according to the drying process described herein.

Catalyst activation. Any one of the foregoing chromium oxide catalyst compounds or silyl chromate catalyst compound, whether unsupported or supported on an uncalcined or calcined support material, independently may be activated by heating in an oxidative environment (e.g., well-dried air or oxygen) at an activation temperature of from 300° C. or higher with the proviso that the maximum activation temperature is below that at which substantial sintering of the compounds and/or support material would occur. The activating gives an activated (unsupported or supported) chromium oxide catalyst compound and/or an activated (unsupported or supported) silyl chromate catalyst compound. For example to activate the Philips catalyst, a fluidized bed of the supported chromium oxide catalyst compound may be activated by passing a stream of dry air or oxygen therethrough, thereby displacing any water therefrom and converting at least some $Cr^{+3}$ compound to $Cr^{+6}$ compound. The maximum activation temperature may be from 300° to 900° C., alternatively 400° to 850° C., alternatively from 500° to 700° C., alternatively from 550° to 650° C. The activation time period may be from 1 to 48 hours, alternatively from 1 to 36 hours, alternatively from 3 to 24 hours, alternatively from 4 to 6 hours. All other things being equal, the higher the activation temperature used, the shorter the activation period of time to achieve a given level of activation, and vice versa. The resulting activated (unsupported or supported) chromium oxide catalyst system may be in the form of a powdery, free-flowing particulate solid.

The reduced chromium oxide catalyst compound. An activated (unsupported or supported) reduced chromium oxide catalyst compound and system may be prepared from the activated (unsupported or supported) chromium oxide catalyst system. In one embodiment, the activated (unsupported or supported) chromium oxide catalyst system has been prepared from a calcined support material. The activated (unsupported or supported) chromium oxide catalyst system may be unmodified, alternatively may have been modified by the silyl chromate compound according to the modifying method described earlier. The preparing comprises agitating a slurry of the activated (unsupported or supported) chromium oxide catalyst system in a non-polar, aprotic solvent under an inert atmosphere, adding a reducing agent to the agitated slurry over a period of time (addition time), and then allowing the resulting reaction mixture to react under the inert atmosphere for a period of time (reaction time) to make the activated (unsupported or supported) reduced chromium oxide catalyst compound and system, which typically is supported on the support material, as a slurry in the non-polar, aprotic solvent. The inert atmosphere may comprise anhydrous $N_2$ gas, Ar gas, He gas, or a mixture thereof. The inert atmosphere may be at a pressure from 101 to 700 kilopascals (kPa). The temperature of the agitated slurry during the adding step may be from 30° to 80° C., alternatively from 40° to 60° C. The agitation may be performed at a rate less than 70 rotations per minute (rpm) and the addition time may be less than 20 minutes. Alternatively, the agitation rate may be greater than 70 rpm and the addition time may be less than 20 minutes. Alternatively, the agitation rate may be greater than 70 rpm and the addition time may be greater than 20 minutes. The agitation rate may be from 30 to 50 rpm, and the addition time may be from 20 to 80 minutes. The temperature of the reaction mixture during the allowing step may be from 20° to 80° C., alternatively from 20° to 60° C., alternatively from 20° to 40° C. The reaction time period may be from 0.08 to 2 hours.

The reducing agent may be an organoaluminum compound, such as an aluminum alkyl or an alkyl aluminum alkoxide. The alkyl aluminum alkoxide may be of formula $R_2AlOR$, wherein each R is independently an unsubstituted $(C_1-C_{12})$alkyl group, alternatively unsubstituted $(C_1-C_{10})$ alkyl group, alternatively unsubstituted $(C_2-C_8)$alkyl group, alternatively unsubstituted $(C_2-C_4)$alkyl group. Examples of the alkyl aluminum alkoxides are diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide and mixtures thereof. In one aspect the reducing agent is diethyl aluminum ethoxide (DEAIE).

The non-polar, aprotic solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. The non-polar, aprotic solvent may be a mixture of at least one acyclic alkane and at least one cyclic alkane.

Thereafter, the slurry of the activated (unsupported or supported) reduced chromium oxide catalyst compound and system may be dried to remove the non-polar, aprotic solvent. The drying comprises heating the slurry, optionally under reduced pressure, and in an environment that excludes oxidizing contaminants such as air or oxygen. The drying process transitions the activated (unsupported or supported) reduced chromium oxide catalyst compound and system from a viscous slurry to a partially dried slurry or mud to a free-flowing powder. Helical ribbon agitators may be used in vertical cylindrical blenders to accommodate the varying mixture viscosities and agitation requirements. Drying may be conducted at pressures above, below, or at normal atmospheric pressure as long as contaminants such as oxygen are strictly excluded from the activated (unsupported or supported) reduced chromium oxide catalyst compound and system. Drying temperatures may range from 0° to 100° C., alternatively from 40° to 85° C., alternatively from 55° to 75° C. Drying times may be from 1 to 48 hours, alternatively from 3 to 26 hours, alternatively from 5 to 20 hours. All other things being equal, the higher the drying temperature and/or lower the drying pressure, the shorter the drying time, and vice versa. After drying, the activated (unsupported or supported) reduced chromium oxide catalyst compound and system may be stored under an inert atmosphere until use.

Activator. Also referred to as a co-catalyst, an activator is a compound that enhances the catalytic performance of a catalyst. Aluminum alkyls may be used as activators for reduced chromium oxide catalyst compounds. The aluminum alkyl may also be used to improve the performance of the activated (unsupported or supported) reduced chromium oxide catalyst compound and system. The use of an aluminum alkyl allows for variable control of side branching in the polymer product, and desirable catalyst productivities. The aluminum alkyl may be applied to the reduced chromium oxide catalyst compound directly before the latter is fed into the GPP reactor. Alternatively, the reduced chromium oxide catalyst compound and aluminum alkyl may be fed separately into the GPP reactor, wherein they contact each other in situ, which may shorten or eliminate any catalyst induction time. See U.S. Pat. No. 7,504,467 B2.

During the inventive method or use, the chromium-based catalyst system, once activated, may be fed into the GPP reactor as a dry powder, alternatively as a slurry in a non-polar, aprotic solvent, which is as described above.

Chromium oxide catalyst compounds and reduced chromium oxide catalyst compounds and methods of preparation thereof, as well as characteristics of the polymer products formed therefrom, are described in U.S. Pat. No. 6,989,344; US 2011/0010938 A1; US 2016/0297907 A1; or WO 2017/132092 A1.

In some embodiments the chromium-based catalyst system comprises the reduced chromium oxide catalyst system. In some embodiments the reduced chromium oxide catalyst system comprises ACCLAIM™ K-100 catalyst system, ACCLAIM™ K-110 catalyst system, or ACCLAIM™ K-120 catalyst system. The ACCLAIM™ catalyst systems are all available from Univation Technologies, LLC, Houston, Texas, USA.

The ACCLAIM™ K-100, K-110, and K-120 catalyst systems may be prepared on commercial scales as follows. The preparations varying slightly depending on a small differences in concentrations of aluminum (DEALE) used thereon in Part (B), described herein. Part (A): activation of supported chromium oxide catalyst system as a powder. Charge a fluidized bed heating vessel with a quantity of a porous silica support containing about 5 wt % chromium acetate (Grade C35300MSF chromium on silica, produced by PQ Corporation), which amounts to about 1 wt % Cr content, having a particle size of about 82 micrometers (μm) and a surface area of about 500 m$^2$/g. Heat up the vessel contents at a rate of about 50° C. per hour under a dry nitrogen stream up to 200° C., and hold at that temperature for about 4 hours. Next, further heat up the vessel contents at a rate of about 50° C. per hour under dry nitrogen to 450° C., and hold at that temperature for about 2 hours. Replace the dry nitrogen stream with a stream of dry air, and heat the vessel contents at a rate of about 50° C. per hour to 600° C., and maintain at 600° C. for about 6 hours to give activated chromium oxide catalyst. Cool the activated catalyst dry air stream (at ambient temperature) to about 300° C., replace the dry air stream with a dry nitrogen stream and further cool from 300° C. to room temperature under the dry nitrogen stream (at ambient temperature). The resulting cooled, activated supported chromium oxide catalyst system is a powder. Store the powder under dry nitrogen atmosphere in a mixing vessel until used in Part (B).

Part (B) reduction of activated chromium oxide catalyst system to give ACCLAIM™ K-100, K-110, or K-120 catalyst system. For pilot scale, fit a vertical catalyst blender with a double helical ribbon agitator, and charge with about 0.86 kg of the powder form of the activated supported chromium oxide catalyst of Part (A) under an inert atmosphere. Add dried hexane or isopentane solvent (7.1 L solvent per kg of powder) to adequately suspend the powder and form a slurry. Agitate the slurry, warm to approximately 45° C., and add a 25 wt % solution of DEAIE (Akzo Nobel) in isopentane or hexane above the surface of the catalyst slurry at a rate so that the addition occurs over about a 40 minutes time period to obtain a selected wt % aluminum loading on the powder, wherein the wt % aluminum loading is different depending upon whether ACCLAIM™ K-100, K-110, or K-120 catalyst system is being prepared. Further agitate the resulting at a controlled rate for about 1 hour on a pilot scale or 2 hours on a commercial scale. Then substantially remove the solvent from the resulting reaction mixture by drying at a selected jacket temperature for about 16 to 21 hours. Select the jacket temperature to give a material temperature that lines out near a target of 61°, 64°, 71°, or 81° C. during the later hours of drying, typically 16 hours for pilot scale. As drying time goes on, apply a progressively stronger vacuum to the vessel. The reduced chromium oxide catalyst system comprising ACCLAIM™ K-100, K-110, or K-120 catalyst system is obtained as a dry, free-flowing powder, which is stored in a container under dry nitrogen pressure until used in a polymerization reaction.

Unimodal ethylene-co-1-butene copolymer

Ethylene. A compound of formula $H_2C=CH_2$. The polymerizable monomer.

1-butene. A compound of formula $H_2C=C(H)CH_2CH_3$. The polymerizable comonomer.

Unimodal ethylene-co-1-butene copolymer. A macromolecule, or collection of macromolecules, composed of repeat units wherein 50.0 to <100 mole percent (mol %), alternatively 70.0 to 99.99 mol %, alternatively 95.0 to 99.9 mol % of such repeat units are derived from ethylene monomer, and from >0 to 50.0 mol %, alternatively from 0.01 to 30.0 mol %, alternatively 0.1 to 5.0 mol % of the remaining repeat units are comonomeric units derived from 1-butene; or collection of such macromolecules. The collection of macromolecules is characterized by a single peak (no shoulder) in a plot of dW/d Log(MW) on the y-axis versus Log(MW) on the x-axis to give a Gel Permeation Chromatograph (GPC) chromatogram, wherein Log(MW) and dW/d Log (MW) are as defined below and measured by Gel Permeation Chromatograph (GPC) Test Method described herein.

Film

The film. The film may be unembossed or embossed. The film may be tailored for specific uses by adjusting thickness of the film, combination with other films or additives, or not. The film may be a monolayer film. In some aspects the film has a thickness from 0.0102 to 0.254 mm (0.400 mil to 10 mils), alternatively from 0.01143 mm to 0.254 mm (0.450 mil to 10 mils), alternatively from 0.01143 mm to 0.127 mm (0.450 mil to 5.00 mils), alternatively from 0.01143 mm to 0.0762 mm (0.450 mil to 3.00 mils), alternatively from 0.0127 mm to 0.0635 mm (0.500 mil to 2.50 mils).

The film may be made using any extrusion or co-extrusion methods including blown, tentered, and cast film methods. The blown film may be made on a blown-film-line machine configured for making polyethylene films. The machine may be configured with a feed hopper in fluid communication with an extruder in heating communication with a heating device capable of heating a polyethylene in the extruder to a temperature of up to 500° C. (e.g., 430° C.), and wherein the extruder is in fluid communication with a die having an inner diameter of 20.3 centimeters (8 inches) and a fixed die gap (e.g., 1.778 millimeter gap (70 mils)), a blow up ratio of 2.5:1, and a Frost Line Height (FLH) of 76±10 centimeters (30±4 inches) from the die. Step (a) may be done in the feed hopper.

The film may be unoriented, uniaxially oriented, or biaxially oriented. The film may be oriented in the direction of extrusion (machine direction or MD), alternatively in the direction transverse to the direction of extrusion (transverse direction or TD). The film may be oriented by stretching or pulling a film in the MD to give a MD oriented film, simultaneously or followed by stretching or pulling the MD oriented film in the TD to give a film that is biaxially oriented in MD and TD.

The film may have one or more improved properties such as enhanced (increased) bubble stability, enhanced (increased) MD and/or TD Elmendorf Tear performance, enhanced (increased) MD tensile strength and/or TD tensile strength, enhanced (increased) dart impact performance, or a combination of any two or more thereof.

The film may be combined with one or more other film layers to make multilayer films or laminates.

The film is useful for making containers and wraps that have enhanced puncture resistance. Examples of such containers are bags such as ice bags and grocery bags. Examples of such wraps are stretch films, meat wraps, and food wraps. The inventive copolymer is also useful in a variety of non-film related applications including in vehicle parts.

The following apply unless indicated otherwise. Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C.

EXAMPLES

Dart Impact Test Method: measured according to ASTM D1709-16a, Standard Test Methods for Impact Resistance of Plastic Film by the Free-Falling Dart Test Method, Method A. Method A employs a dart with a 38.10±0.13-mm (1,500±0.005-in.) diameter hemispherical head dropped from a height of 0.66±0.01 m (26.0±0.4 in.). This test method can be used for films whose impact resistances require masses of about 50 g or less to about 6 kg to fracture them. Results expressed in grams (g).

Density is measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm$^3$). In some aspects the density is from 0.89 to 0.98 g/cm$^3$, alternatively from 0.92 to 0.97 g/cm$^3$, alternatively 0.940 to 0.960 g/cm$^3$.

Dynamic Mechanical Analysis (DMA) Test Method: a dynamic mechanical analysis method measured at 190° C. and 0.126 radians per second (rad/s) or 126 rad/s using the following procedure: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). Obtain a SH1000 value by calculating the complex viscosities ($\eta^*$) at given values of frequency ($\omega$), and calculating the ratio of the two viscosities. For example, using the values of frequency ($\omega$) of 0.126 rad/s and 126 rad/s, obtain the SH1000=Eta0.126/Eta126 (i.e., $\eta^*$(0.126 rad/s)/$\eta^*$(126 rad/s) at a constant value of loss modulus G" of 3,000 pascals (Pa). The SH1000 is defined as the ratio of the two complex viscosities Eta0.126/Eta126 (i.e., $\eta^*$(0.126 rad/s)/$\eta^*$(126 rad/s).

Elmendorf Tear Test Method: measured according to ASTM D1922-09, Standard Test Methods for Propagation Tear Resistance of Plastic Film and Thin Sheeting by Pendulum Method, Type B (constant radius). (Technically equivalent to ISO 6383-2.) Report results as normalized tear in cross direction (CD) or machine direction (MD) in gram-force (gf).

Film Puncture Test Method: ASTM D5748-95(2012), Standard Test Method for Protrusion Puncture Resistance of Stretch Wrap Film. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions.

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

High Load Melt Index (HLMI) $I_{21}$ Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.).

Melt Index ("$I_2$") Test Method: for ethylene-based (co)polymer is measured according to ASTM D1238-13, using conditions of 190° C./2.16 kg, formerly known as "Condition E" and also known as $I_2$.

Melt Index $I_5$ ("$I_5$") Test Method: use ASTM D1238-13, using conditions of 190° C./5.0 kg. Report results in units of grams eluted per 10 minutes (g/10 min.).

Melt Flow Ratio MFR5:("$I_{21}/I_5$") Test Method: calculated by dividing the value from the HLMI $I_{21}$ Test Method by the value from the Melt Index $I_5$ Test Method.

Melt Storage Modulus Test Method: On polymer melts at 190° C. perform small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G' (G"=3,000 Pa) value in pascals of melt storage modulus (G') at a dynamic frequency where loss modulus (G") is equal to 3,000 Pa.

Optical Gloss Test Method: ASTM D2457-13, Standard Test Method for Specular Gloss of Plastic Films and Solid Plastics. Measure specular gloss using a glassometer at incident angles 20°, 45°, 60°, or 75°. Specular gloss is unitless.

Optical Haze Test Method: D1003-13, Standard Test Method for Haze and Luminous Transmittance of Transparent Plastics. Measure haze using a hazemeter. Express haze as percentage of luminous transmission which in passing through the film deviates from an incident beam by forward scattering.

1% or 2% Secant Modulus Test Method: measured according to ASTM D882-12, Standard Test Methods for Tensile Properties of Thin Plastic Sheeting. Used either 1% or 2% secant modulus in cross direction (CD) or machine direction (MD). Report results in megapascals (MPa). 1,000.0 pounds per square inch (psi)=6.8948 MPa.

Tensile Modulus Test Method: measured according to ASTM D882-12, Standard Test Methods for Tensile Properties of Thin Plastic Sheeting. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Antioxidant 1: pentaerythritol tetrakis(3-(3,5-di-tert-butyl-4-hydroxyphenyl)propionate. Obtained as IRGANOX 1010 from BASF.

Antioxidant 2: tris(2,4-di-tert-butylphenyl)phosphite. Obtained as IRGAFOS 168 from BASF.

Catalyst Neutralizer 1: calcium stearate.

Catalyst Neutralizer 2: zinc stearate.

Chromium-based Catalyst system: the ACCLAIM™ K-100 catalyst system. Obtained from Univation Technologies LLC, Houston, Texas, USA.

Comonomer: 1-butene. See later for $C_4/C_2$ gas molar ratio.

Ethylene ("$C_2$"): See later for partial pressure of $C_2$.

Molecular hydrogen gas ("$H_2$"): See later for $H_2/C_2$ gas molar ratio.

Molecular oxygen gas ("$O_2$"): See later for $O_2/C_2$ gas volume ratio.

Unimodal ethylene-co-1-butene copolymers: target density is 0.948 to 0.950 g/cm$^3$ and target flow index ($I_{21}$) is 15 to 19 g/10 minutes.

Inventive Examples 1 to 5 (IE1 to IE5): polymerization procedure: Runs began with ACCLAIM™ K-100 Catalyst and comonomer 1-butene according to the Pilot Reactor and method described earlier to give in different parts, as described below, different embodiments of the unimodal ethylene-co-1-butene copolymer as granular resins. The operating conditions for the polymerization are reported below in Table 1.

TABLE 1

Operating conditions for IE1 to IE5.

| | IE1 | IE2 | IE3 | IE4 | IE5 |
|---|---|---|---|---|---|
| PART No. | 1 | 3 | 4 | 5 | 5-6 |
| Reactor Type | S, CM, PP, FB GPP* | S, CM, PP, FB GPP | S, CM, PP, FB GPP | S, CM, PP, FB GPP | S, CM, PP, FB GPP |
| Reactor Purging gas | Anhydrous $N_2$ | Anhydrous $N_2$ | Anhydrous $N_2$ | Anhydrous $N_2$ | Anhydrous $N_2$ |
| Bed Temp. (° C.) | 102.0 | 105.0 | 105.0 | 110.0 | 110.0 |
| Rx Pressure (kpa) | 2501.9 | 2501.8 | 2502.7 | 2503.6 | 2501.7 |
| $C_2$ Partial Pressure (kpa) | 1378.9 | 1377.8 | 1378.8 | 1377.2 | 1379.6 |
| $H_2/C_2$ Molar Ratio | 0.102 | 0.057 | 0.102 | 0.102 | 0.057 |
| $C_4/C_2$ Molar Ratio | 0.0201 | 0.0200 | 0.0190 | 0.0151 | 0.0160 |
| $O_2/C_2$ Volume Ratio (ppbv) | 66.4 | 75.1 | 55.0 | 35.5 | 50.6 |
| Induced Condensing Agent | None | None | None | None | None |
| Superficial Gas Velocity (m/sec) | 0.52 | 0.53 | 0.54 | 0.54 | 0.52 |
| Unimodal Catalyst System | ACCLAIM ™ K-100 | ACCLAIM ™ K-100 | ACCLAIM ™ K-100 | ACCLAIM ™ K-100 | ACCLAIM ™ K-100 |
| Catalyst loading (Cr, wt %) | 0.843 | 0.843 | 0.843 | 0.843 | 0.843 |
| Catalyst loading (Al, wt %) | 1.392 | 1.392 | 1.392 | 1.392 | 1.392 |
| Starting seedbed = granular HDPE resin | Preloaded in reactor | Preloaded in reactor | Preloaded in reactor | Preloaded in reactor | Preloaded in reactor |
| Starting Bed Weight (kg) | 42.6 | 39.6 | 43.4 | 45.5 | 43.0 |
| Copolymer Production Rate (kg/hour) | 18.2 | 16.3 | 18.0 | 18.3 | 17.4 |

TABLE 1-continued

Operating conditions for IE1 to IE5.

| PART No. | IE1<br>1 | IE2<br>3 | IE3<br>4 | IE4<br>5 | IE5<br>5-6 |
|---|---|---|---|---|---|
| Copolymer Residence Time (hour) | 2.35 | 2.42 | 2.41 | 2.49 | 2.47 |
| Copolymer Fluid Bulk Density, Comp. (kg/m³) | 214.7 | 209.9 | 222.3 | 235.5 | 221.9 |

*S, CM, PP, FB, GPP: single, continuous mode, pilot plant, fluidized bed gas phase polymerization.
˄Rx Pressure (kPa): reactor total pressure in kilopascals.

As shown in Table 1, the operating conditions used to make the unimodal ethylene-co-1-butene copolymers of IE1 to IE5 comprise a bed temperature from 102.0° to 110.0° C.; an ethylene ($O_2$) partial pressure from 1377 to 1380 kpa; an $H_2/C_2$ Molar Ratio from 0.057 to 0.102; a $C_4/C_2$ Molar Ratio from 0.0151 to 0.0201; an $O_2/C_2$ Volume Ratio from 35.5 to 75.1 ppbv (parts per billion by volume/volume); and a superficial gas velocity from 0.52 to 0.54 m/sec (meter per second). In certain embodiments, the method of synthesizing the unimodal ethylene-co-1-butene copolymer employ the aforementioned operating conditions.

Formulation and Pelletization Procedure: Each of the different granular resins of IE1 to IE5 was separately mixed with 1,300 parts per million weight/weight (ppm) of Antioxidant 1, 1,300 ppm Antioxidant 2, 1,500 ppm Catalyst Neutralizer 1, and 700 ppm Catalyst Neutralizer 2 in a ribbon blender, and then compounded into strand cut pellets using a twin-screw extruder ZSK40. The resulting pellets of each resin were tested for flow index ($I_{21}$), density, and melt storage modulus G' (G"=3,000 Pa) according to their aforementioned respective test methods. Results are reported later. In certain embodiments, the unimodal ethylene-co-1-butene copolymer further comprises at least one antioxidant selected from Antioxidants 1 and 2; at least one catalyst neutralizer selected from Catalyst Neutralizers 1 and 2; or a combination thereof. Results are reported below in Table 2.

TABLE 2

Melt properties of IE1 to IE5.

| Test | IE1 | IE2 | IE3 | IE4 | IE5 |
|---|---|---|---|---|---|
| $I_{21}$ (190° C., 21.6 kg) (g/10 min.) | 16.4 | 16.5 | 14.8 | 15.5 | 18.7 |
| MFR5 ($I_{21}/I_5$) | 26.0 | 24.8 | 24.5 | 22.0 | 20.7 |
| melt elasticity G' (G" = 3,000 Pa) (Pa) | 2236 | 2192 | 2139 | 1974 | 1990 |
| Eq. 1 met? | Yes | Yes | Yes | Yes | Yes |
| Shear thinning SH1000 | 47.5 | 44.4 | 44.9 | 39.1 | 35.9 |
| Eq. 2 met? | Yes | Yes | Yes | Yes | Yes |

As shown in Table 2, the melt properties of the unimodal ethylene-co-1-butene copolymers of IE1 to IE5 comprise a high-load melt index $I_{21}$ (190° C., 21.6 kg) from 14.8 to 18.7 g/10 min.; a melt flow ratio MFR5 ($I_{21}/I_5$) from 20.7 to 26.0; a melt elasticity G' (G"=3,000 Pa) from 1974 to 2236 Pa; a shear thinning SH1000 from 35.9 to 47.5; and satisfaction of each of Equations 1 and 2.). In certain embodiments, the unimodal ethylene-co-1-butene copolymer is characterized by any one, alternatively all but one, alternatively each of the aforementioned melt properties.

The melt properties data in Table 2 for the unimodal ethylene-co-1-butene copolymer were analyzed to discover on what reactor/process operating conditions the melt properties depend. The following operating conditions are found to influence the melt properties of the unimodal ethylene-co-1-butene copolymer made thereby: increasing $H_2/O_2$ gas molar ratio and reactor bed temperature in the process yielded inventive unimodal ethylene-co-1-butene copolymer beneficially having improved (reduced) shear thinning and lower melt elasticity G' (G"=3,000 Pa) (Pa), and thus having improved (increased) bubble stability in blown film process.

Granular resins of IE1 to IE5 were characterized by density, molecular weights, molecular mass dispersity ($M_w/M_n$), Øm, $I_5$, $I_{21}$. Results are reported below in Table 3.

TABLE 3

Resin properties of IE1 to IE5.

| Test | IE1 | IE2 | IE3 | IE4 | IE5 |
|---|---|---|---|---|---|
| Density (g/cm³) | 0.949 | 0.949 | 0.949 | 0.949 | 0.949 |
| $M_n$ (g/mol) | 12,196 | 11,955 | 12,020 | 12,783 | 12,860 |
| $M_w$ (g/mol) | 303,745 | 309,455 | 278,978 | 309,879 | 263,745 |
| $M_w/M_n$ ($Đ_M$) | 24.91 | 25.89 | 23.21 | 24.24 | 20.51 |
| $M_z$ (g/mol) | 3,579,743 | 3,736,107 | 2,438,342 | 3,797,848 | 2,425,366 |

As shown in Table 3, the resin properties of the unimodal ethylene-co-1-butene copolymers of IE1 to IE5 comprise a density of 0.949 g/cm³; a number-average molecular weight from 11,955 to 12,860 g/mol; a weight-average molecular weight from 263,745 to 309,879 g/mol; a molecular mass dispersity $M_w/M_n$ ($Đ_M$) from 20.51 to 25.89; and a z-average molecular weight from 2,425,366 to 3,797,848 g/mol. In certain embodiments, the unimodal ethylene-co-1-butene copolymer is characterized by any one, alternatively all but one, alternatively each of the aforementioned resin properties.

Film Forming Procedure: Pellets of granular resins of the unimodal ethylene-co-1-butene copolymer of IE1 to IE5 are separately melted at melt temperature described herein, and separately blown into films using an Alpine 50 millimeter (mm) 25:1 length to diameter (L/D) dimensioned barrier single screw extruder, a 120 mm inner diameter die, a 1.2 mm die gap, without IBC (internal bubble cooling). The bubble stabilities of the films were measured according to the following method: (a) bubble rating at standard output rate of 6.9 kilograms per hour-centimeter (kg/hour-cm, bubble rating STD); (b) a bubble rating at standard output rate with maximum line speed greater than 14.2 meters per minute (m/min., bubble rating MLS); and (c) bubble rating at maximum output rate (20% or more output rate, bubble rating MOR). Bubble ratings were scored on a scale from 1 to 5 as follows: 1. Film could not be made. 2. Film could be made but production of film had bubble instability. 3. Film could be made but production of film had slight bubble instability. 4. Film could be made with bubble stability. 5. Film could be made with very stable bubble. If the bubble rating is 4 or 5, the resin passes the bubble stability test and is characterized as "Good". If the bubble rating is 3, the resin passes the bubble stability test and is characterized as "Okay". If the bubble rating is 2, the resin fails the bubble stability test and is characterized as "Moderate". If the bubble rating is 1, the resin fails the bubble stability test and is characterized as "Poor". Also, dart impact and Elmendorf tear were measured on films having a thickness of 0.0127 millimeter (mm)=12.7 micrometer (μm) and according to the aforementioned test methods. Film results are reported below in Table 4.

TABLE 4

Film properties of IE1 to IE5.

| Test | IE1 | IE2 | IE3 | IE4 | IE5 |
|---|---|---|---|---|---|
| Extruder speed (rpm) | 94 | 94 | 94 | 94 | 94 |
| Motor load (%) | 63.3 | 63.5 | 63.7 | 64.6 | 61.7 |
| melt temp. (° C.) | 196.3 | 194.2 | 195.8 | 193.9 | 197.3 |
| Die Press (MPa) | 36.4 | 35.1 | 37.6 | 38.9 | 36.4 |
| Bubble Rating STD | Good | Good | Good | Good | Good |
| Bubble Rating MLS | Good | Good | Good | Good | Good |
| Bubble Rating MOR | Good | Good | Good | Good | Okay |
| Avg. Tear CD (gf) | 46 | 64 | 63 | 155 | 150 |
| Avg. Tear MD (gf) | 22 | 19 | 18 | 16 | 13 |
| Dart Impact (g) | 123 | 131 | 126 | 135 | 119 |

As shown in Table 4, the film properties of the blown films of the unimodal ethylene-co-1-butene copolymers of IE1 to IE5 comprise a bubble rating STD of Good, a bubble rating MLS of Good, a bubble rating MOR of Good or okay, an average Elmendorf Tear in cross-direction (CD) from 46 to 155 gf, an average Elmendorf tear in machine direction (MD) from 13 to 22 gf, and a dart impact from 119 to 135 g. In certain embodiments, the unimodal ethylene-co-1-butene copolymer, and the blown films thereof, are independently characterized by any one, alternatively all but one, alternatively each of the aforementioned film properties.

Prophetic Characterizations: The unimodal ethylene-co-1-butene copolymers of IE1 to IE5 may be further characterized by any one or more of the Melt Index ("$I_2$") Test Method, 1% or 2% Secant Modulus Test Method, and Tensile Modulus Test Method. The films made from the unimodal ethylene-co-1-butene copolymers of IE1 to IE5 may be further characterized by any one or more of the Film Puncture Test Method, Optical Gloss Test Method, and Optical Haze Test Method.

The invention claimed is:

1. A unimodal ethylene-co-1-butene copolymer that, when in melted form at 190° C., is characterized by a melt property space defined by a combination of shear thinning and melt elasticity properties, wherein the shear thinning property is defined according to equation 1 (Eq. 1): G' (G"=3,000 Pa)<66.6*MFR5+630 (Eq. 1); and the melt elasticity property is defined according to equation 2 (Eq. 2): G' (G"=3,000 Pa)<23.5*SH1000+1182 (Eq. 2); wherein < is less than; * is multiplication; / is division; = is equals; G' (G"=3,000 Pa) is Melt Storage Modulus in Pascals (Pa) measured according to Melt Storage Modulus Test Method at loss modulus G"=3000 pascals; MFR5 is melt flow ratio $I_{21}/I_5$; $I_{21}$ is high-load melt index (HLMI) in grams per 10 minutes (g/10 min.) measured according to ASTM D1238-13 at 190° C. and under a 21.6 kg load; $I_5$ is melt index in g/10 min. measured according to ASTM D1238-13 at 190° C. and under a 5.0 kg load; SH1000=Eta0.126/Eta126; Eta0.126 is complex viscosity in Pascal-seconds (Pa-s) measured at 0.126 radian per second (rad/s) by Dynamic Mechanical Analysis Test Method; and Eta126 is complex viscosity Pa-s measured at 126 rad/s by the Dynamic Mechanical Analysis Test Method, wherein the unimodal ethylene-co-1-butene copolymer has an $I_{21}$ from 13.0 to 25.0 g/10 min., measured according to ASTM D1238-13, further wherein the unimodal ethylene-co-1-butene copolymer has a $M_w/M_n$ molecular mass dispersity from 20.0 to 26.0.

2. The unimodal ethylene-co-1-butene copolymer of claim 1 wherein the melt property space is further defined by any one of limitations (i) to (iii): (i) a MFR5 ("$I_{21}/I_5$") from 20.0 to 27.0, measured according to ASTM D1238-13; (ii) an SH1000 from 35.0 to 49.0, measured by the Dynamic Mechanical Analysis Test Method; and (iii) a melt storage modulus G' (G"=3,000 Pa) value from 1900 to 2300 Pa, measured according to the Melt Storage Modulus Test Method.

3. The unimodal ethylene-co-1-butene copolymer of claim 1 characterized by any one of limitations (i) to (iv): (i) a density from 0.9410 to 0.9550 gram per cubic centimeter (g/cm³), measured according to ASTM D792-13, Method B; (ii) a weight-average molecular weight ($M_w$) from 200,000.0 to 400,000.0 grams per mole (g/mol), measured according to the Gel Permeation Chromatography (GPC) Test Method; (iii) a number-average molecular weight ($M_n$) from 11,000.0 to 14,000.0 g/mol, measured according to the GPC Test Method; (iv) a z-average molecular weight ($M_z$) from 2,400,000 to 3,600,000 g/mol, measured according to the GPC Test Method.

4. The unimodal ethylene-co-1-butene copolymer of claim 1 that, when in the form of a blown film and having a thickness of 0.0127 millimeter (mm, 0.500 mil), is characterized by any one of limitations (i) to (iii): (i) a dart impact from 115 to 139 grams (g), measured according to the Dart Impact Test Method; (ii) an Elmendorf tear in cross direction (CD) from 40.0 to 160.0 gram-force (gf), measured according to the Elmendorf Tear Test Method; (iii) an Elmendorf tear in machine direction (MD) from 10.0 to 250.0 gf, measured according to the Elmendorf Tear Test Method.

5. A manufactured article comprising the unimodal ethylene-co-1-butene copolymer of claim 1.

6. A film consisting essentially of the unimodal ethylene-co-1-butene copolymer of claim 1.

* * * * *